United States Patent
Fakoorian et al.

(10) Patent No.: US 12,284,653 B2
(45) Date of Patent: Apr. 22, 2025

(54) ENHANCEMENT OF PUCCH TRANSMISSIONS

(71) Applicant: Apple Inc., Cupertino, CA (US)

(72) Inventors: Seyed Ali Akbar Fakoorian, San Diego, CA (US); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/755,591

(22) PCT Filed: May 10, 2021

(86) PCT No.: PCT/CN2021/092721
§ 371 (c)(1),
(2) Date: May 3, 2022

(87) PCT Pub. No.: WO2022/236563
PCT Pub. Date: Nov. 17, 2022

(65) Prior Publication Data
US 2024/0323963 A1    Sep. 26, 2024

(51) Int. Cl.
*H04W 72/21* (2023.01)
*H04B 1/713* (2011.01)
(Continued)

(52) U.S. Cl.
CPC ............ *H04W 72/21* (2023.01); *H04B 1/713* (2013.01); *H04W 72/231* (2023.01); *H04L 1/18* (2013.01)

(58) Field of Classification Search
CPC ... H04W 72/21; H04W 72/231; H04W 72/23; H04W 72/04; H04B 1/713; H04B 1/7163;
(Continued)

(56) References Cited

U.S. PATENT DOCUMENTS

2015/0131579 A1   5/2015   Li et al.
2019/0182824 A1*  6/2019   Chatterjee ............... H04W 4/70
(Continued)

FOREIGN PATENT DOCUMENTS

| CN | 108632191 | 10/2018 |
| CN | 110365451 | 10/2019 |
| CN | 110583081 | 12/2019 |

OTHER PUBLICATIONS

"Discussion on PUCCH enhancements", Jan. 25-Feb. 5, 2021 (Year: 2021).*

(Continued)

*Primary Examiner* — Mewale A Ambaye
(74) *Attorney, Agent, or Firm* — Fay Kaplun & Marcin, LLP

(57) ABSTRACT

A user equipment (UE) is configured to determine a repetition factor for physical uplink control channel (PUCCH) transmissions. The UE receives a first physical uplink control channel (PUCCH) repetition factor indication, wherein the first PUCCH repetition factor indication is a radio resource control (RRC)-based indication, receives a second PUCCH repetition factor indication, wherein the second PUCCH repetition factor is dynamically indicated via a downlink control information (DCI) transmission and determines a number of PUCCH repetitions based on at least one of the first and second PUCCH repetition factor indications.

18 Claims, 5 Drawing Sheets

(51) Int. Cl.
*H04W 72/231* (2023.01)
*H04L 1/18* (2023.01)
(58) Field of Classification Search
CPC ... H04L 1/18; H04L 69/16; H04L 1/00; H04L 1/16
See application file for complete search history.

(56) References Cited

U.S. PATENT DOCUMENTS

| | | | |
|---|---|---|---|
| 2022/0225365 A1* | 7/2022 | Cozzo | H04L 1/18 |
| 2022/0393800 A1* | 12/2022 | Ratilainen | H04W 72/23 |
| 2022/0408428 A1* | 12/2022 | Tian | H04B 1/7143 |
| 2023/0041930 A1* | 2/2023 | Taherzadeh Boroujeni | H04L 1/1858 |
| 2023/0137450 A1* | 5/2023 | Liu | H04W 72/23 370/329 |
| 2023/0140539 A1* | 5/2023 | Elshafie | H04L 5/0051 455/411 |

OTHER PUBLICATIONS

China Telecom, "Discussion on PUCCH enhancements", 3GPP TSG RAN WG1 #104, R1-2100918, Feb. 5, 2021, 2 sheets.

* cited by examiner

ENHANCEMENT OF PUCCH TRANSMISSIONS

TECHNICAL FIELD

This application relates generally to wireless communication, and in particular relates to Enhancement of PUCCH Transmissions.

BACKGROUND

In 5G new radio (NR) wireless communications, a user equipment (UE) may perform a random access channel (RACH) procedure to connect to a 5G NR network. To improve reliability, some of the transmissions between the UE and a next generation Node-B (gNB) of the network may be transmitted with repetitions.

SUMMARY

Some exemplary embodiments are related to a processor of a user equipment (UE) configured to perform operations. The operations include receiving a first physical uplink control channel (PUCCH) repetition factor indication, wherein the first PUCCH repetition factor indication is a radio resource control (RRC)-based indication, receiving a second PUCCH repetition factor indication, wherein the second PUCCH repetition factor is dynamically indicated via a downlink control information (DCI) transmission and determining a number of PUCCH repetitions based on at least one of the first and second PUCCH repetition factor indications.

Other exemplary embodiments are related to a processor of a user equipment (UE) configured to perform operations. The operations include receiving a cell-specific physical uplink control channel (PUCCH) configuration and determining a PUCCH repetition factor for a transmission over a cell-specific PUCCH.

Still further exemplary embodiments are related to a processor of a user equipment (UE) configured to perform operations. The operations include receiving a physical uplink control channel (PUCCH) resource set configuration, wherein the PUCCH resource set configuration includes up to four PUCCH resource sets, receiving a downlink control information (DCI) transmission including a PUCCH resource indicator (PRI), selecting one of the up to four PUCCH resource sets based on a payload size of a PUCCH transmission to be sent and selecting a PUCCH resource ($r_{PUCCH}$) from the selected PUCCH resource set based on (i) a number ($N_{CCE}$) of control channel elements (CCEs) of a control resource set (CORESET) of a physical downlink control channel (PDCCH) reception with DCI Format 1_0 or 1_1, (ii) a first CCE ($n_{CCE}$) of the PDCCH reception, and (iii) the PRI of the DCI transmission.

DETAILED DESCRIPTION

Figure 1:
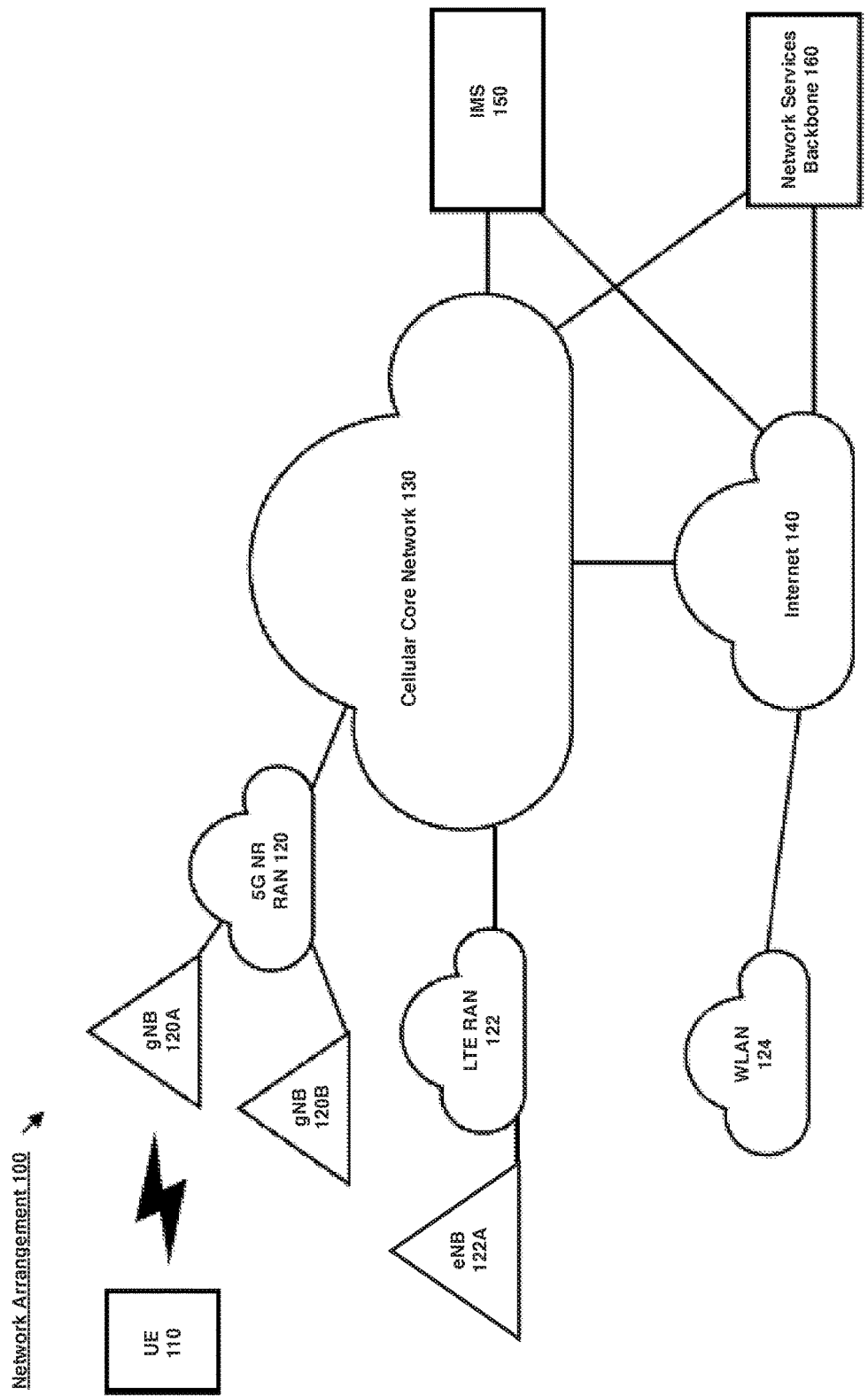
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to a user equipment (UE) receiving a physical uplink control channel (PUCCH) configuration and determining a repetition factor for a PUCCH transmission. The exemplary embodiments further relate to the UE determining a frequency hopping (FH) type.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component.

In addition, the exemplary embodiments are described with regard to a 5G New Radio (NR) network. However, reference to a 5G NR network is merely provided for illustrative purposes. The exemplary embodiments may be utilized with any network that implements the functionalities described herein.

A next generation NodeB (gNB) of a 5G NR network configures a UE with a cell-specific PUCCH configuration that may apply to all UEs within that cell. For example, this non-UE specific PUCCH configuration occurs during an initial random access channel (RACH) procedure during which the UE has not yet established a radio resource control (RRC) connection to the network. In such a scenario, the UE transmits a hybrid automatic repeat request acknowledgement (HARQ-ACK) over the PUCCH to acknowledge reception of the Message 4 (Msg4) transmission. However, the current 3GPP standards do not address a PUCCH repetition factor or a frequency hopping type for a PUCCH transmission based on a cell-specific PUCCH configuration.

According to the exemplary embodiments, a UE determines a row index ($r_{PUCCH}$) corresponding to a row of Table 9.2.1-1 of 3GPP 38.213 section 9.2.1, which, among other PUCCH parameters, indicates a repetition factor. In some embodiments, the Table also indicates a frequency hopping type (inter-slot or intra-slot).

Current 3GPP standards do not address how a UE should handle multiple PUCCH repetition configurations. For example, if an RRC configuration of the UE indicates a first PUCCH repetition factor and a dynamic indication indicates a second PUCCH repetition factor different than the first PUCCH repetition factor, the current 3GPP standards do not address how the UE should handle the two indications.

According to further exemplary embodiments, the UE is configured to apply one or more PUCCH repetition factors when the UE is configured with more than one PUCCH repetition factor.

When a UE is configured with a PUCCH configuration, a PUCCH resource indicator (PRI) bit-field ($\Delta_{PRI}$) of a downlink control information (DCI) format 1_0 or 1_1 received from the gNB indicates which PUCCH resource of a resource set should be used for a PUCCH transmission. If the PUCCH configuration is cell-specific, the UE may be configured with up to 16 resources, as indicated by the number of rows of Table 9.2.1-1 of 3GPP 38.213 section 9.2.1. If the PUCCH configuration is UE-specific, the UE may be configured with up to four PUCCH resource sets, the first set having up to 32 resources and the remaining set (s) having up to 8 resources. 3GPP 38.213 section 9.2.1 addresses how to select a PUCCH resource if the PUCCH configuration is cell specific (and not UE-Specific). As explained in 3GPP 38.213 section 9.2.1, the UE selects one set based on a payload size (the number of uplink control information (UCI) bits) of the PUCCH transmission. Once the resource set has been selected, 3GPP 38.213 section 9.2.3 addresses how the UE should select one of the resources of the selected resource set if the selected resource set is the first resource set, which includes more than 8 resources. However, current 3GPP standards do not address a scenario in which each PUCCH resource is additionally configured with a corresponding repetition factor. In such a scenario, it is unclear how the 3-bit PRI field in DCI 1_0 or 1_1 would indicate which resource to select.

According to still further exemplary embodiments, the UE may be configured to select a PUCCH resource based on the method explained in 3GPP 38.213 section 9.2.3 for one or more of the PUCCH resource sets and/or the method explained in 3GPP 38.213 section 9.2.1 for the other one or more of the PUCCH resource sets.

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. The gNBs 120A and 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UE. During operation, the UE 110 may be within range of a plurality of gNBs. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
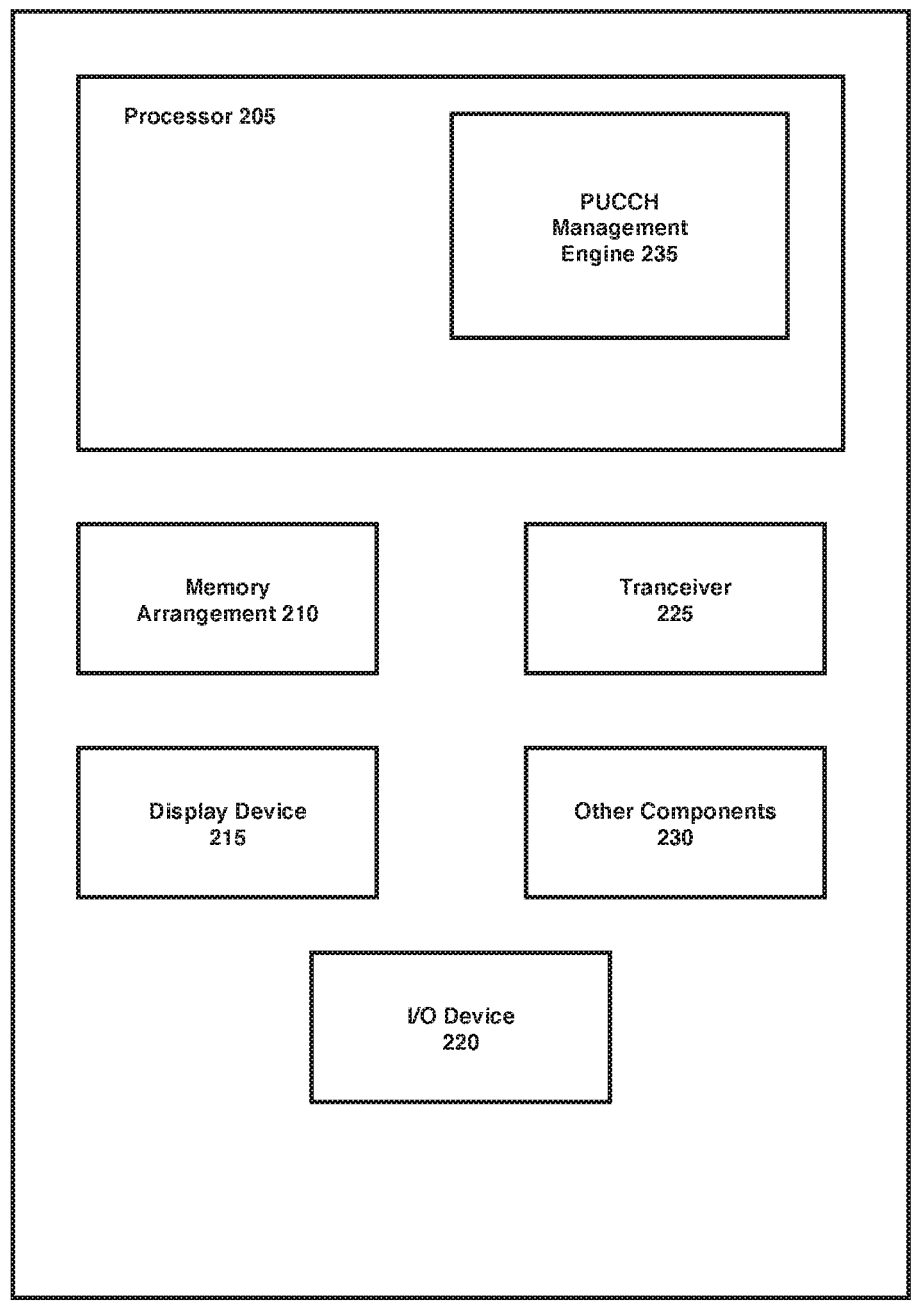
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include PUCCH management engine 235. The PUCCH management engine 235 may perform various operations related to receiving a PUCCH configuration and determining a PUCCH resource, repetition factor, and/or frequency hopping type based on the configuration, as will be described in greater detail below.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
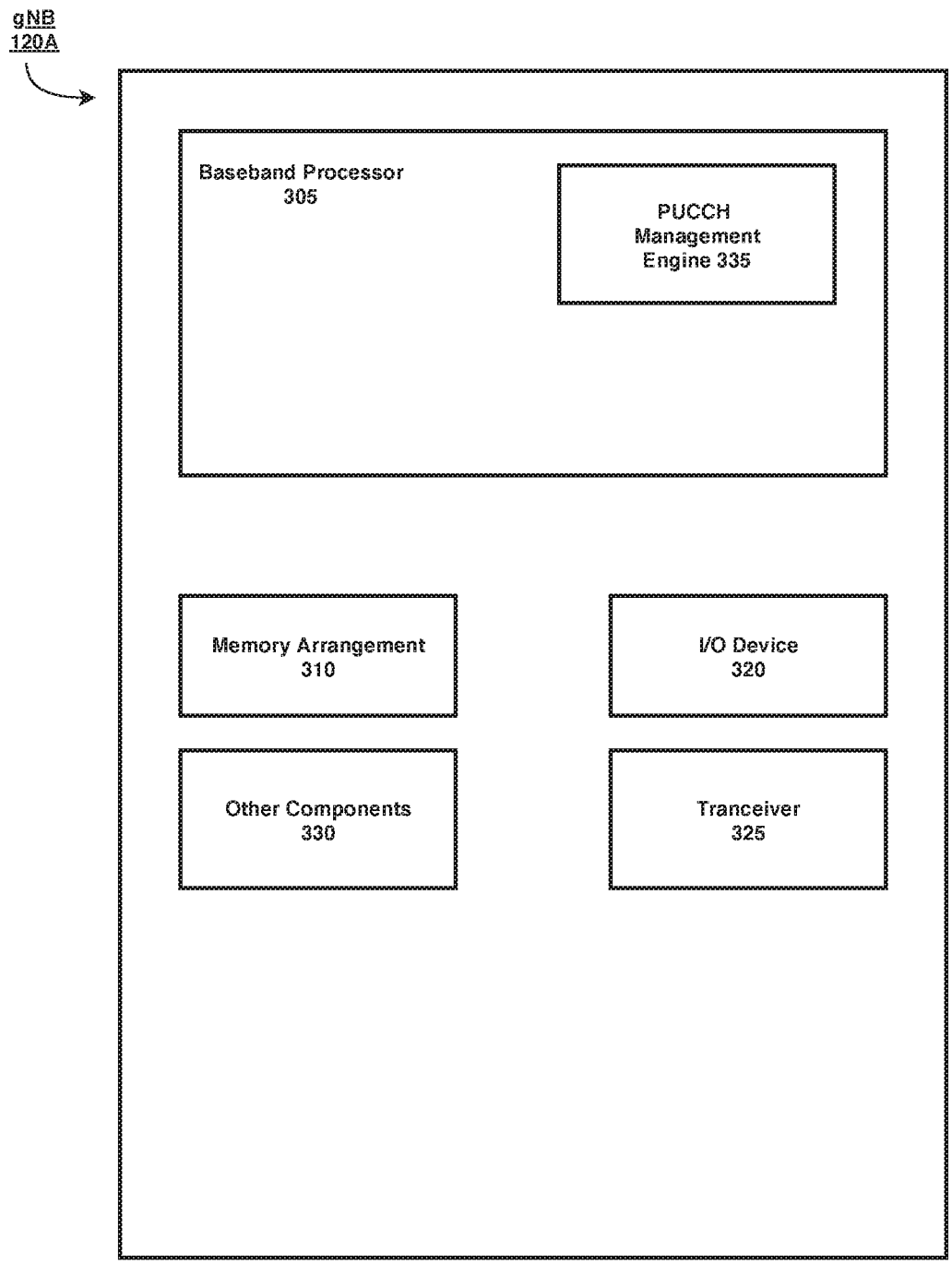
FIG. 3 shows an exemplary base station according to various exemplary embodiments.

FIG. 3 shows an exemplary network base station, in this case gNB 120A, according to various exemplary embodiments. The gNB 120A may represent any access node of the 5G NR network through which the UEs 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include a PUCCH management engine 335 for performing operations including configuring PUCCH parameters for a UE. Examples of this process will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4:
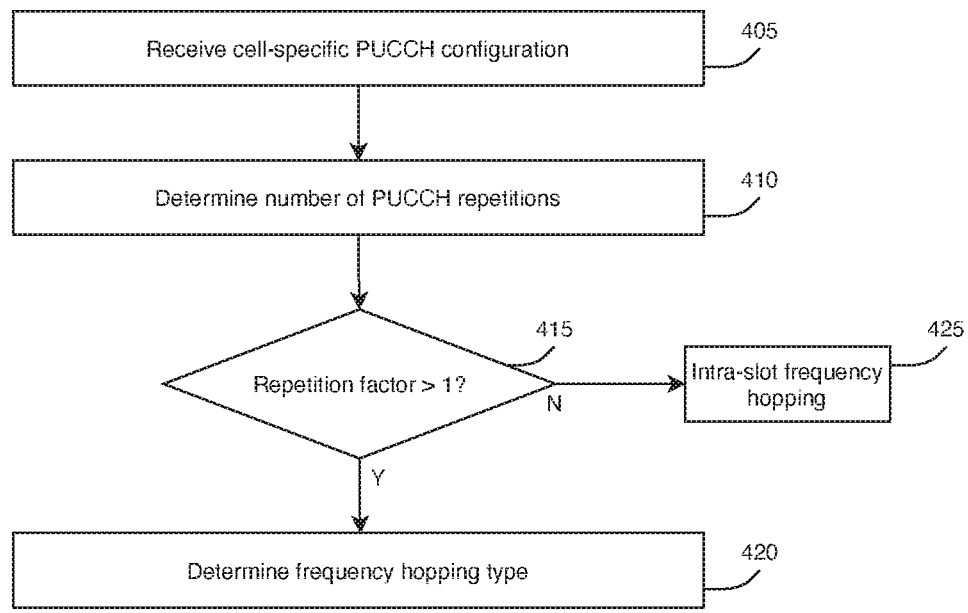
FIG. 4 shows a method of determining physical uplink control channel (PUCCH) parameters when a UE is configured with a cell-specific PUCCH configuration according to various exemplary embodiments.

FIG. 4 shows a method 400 of determining PUCCH parameters when the UE 110 is configured with a cell-specific PUCCH configuration according to various exemplary embodiments. As noted above, for example, such a cell-specific PUCCH configuration may occur during an initial RACH procedure for the HARQ-ACK transmission over the PUCCH. At 405, the UE 110 receives a cell-specific PUCCH configuration from the gNB 120A (or 120B). In some embodiments, the cell-specific PUCCH configuration includes a repetition factor greater than 1 repetition for one or more rows of Table 9.2.1-1 of 3GPP 38.213 that are associated with PUCCH Format 1. In some embodiments, the cell-specific PUCCH configuration may further include a frequency hopping type (inter-slot or intra-slot) for one or more rows of Table 9.2.1-1 that are associated with PUCCH Format 1.

At 410, the UE 110 determines a PUCCH repetition factor (number of PUCCH repetitions). In some embodiments, this determination includes determining the PUCCH resource index ($r_{PUCCH}$) which corresponds to one of the rows of Table 9.2.1-1. According to exemplary embodiments of the present disclosure, each row corresponding to PUCCH Format 1 may have a corresponding repetition factor greater than 1. In some embodiments, the UE 110 may alternatively determine the PUCCH repetition factor based on the number of repetitions of the received Msg3 or the aggregation level (AL) of the physical downlink control channel (PDCCH) that schedules a Msg4 transmission.

In some embodiments, the UE 110 may alternatively determine a PUCCH repetition factor based on a DCI that schedules the PUCCH transmission. In such an embodiment, some of the bitfields of a DCI that schedules the PUCCH transmission may indicate the number of repetitions for the PUCCH transmission. For example, in some embodiments, the reserved bits in a downlink assignment indicator (DAI) of the DCI with CRC scrambled by temporary cell radio network temporary identifier (TC-RNTI) may indicate to the UE 110 how to interpret Table 9.2.1-1. That is, these reserved bits may indicate whether the UE 110 should interpret the table as a legacy table (with no repetitions) (e.g., DAI bit value of 00) or as a newly configured table (where some of the format 1 rows have a corresponding repetition factor greater than 1) (e.g., DAI bit value of 11). In some embodiments, the reserved bits of the DAI may alternatively be mapped to repetition factors defined by a system information block (SIB) (e.g., 1, 2, 4, 8) received from the gNB 120A.

At 415, the UE 110 determines if the repetition factor determined at 410 is greater than 1. If the repetition factor is not greater than 1, then, at 425, the UE 110 determines that the frequency hopping type is intra-slot frequency.

If, however, the repetition factor is greater than 1, then at 420, the UE 110 determines a frequency hopping type (inter-slot or intra-slot) for the PUCCH transmission with repetitions. In some embodiments, this determination includes determining the PUCCH resource index ($r_{PUCCH}$) which corresponds to one of the rows of Table 9.2.1-1. According to exemplary embodiments of the present disclosure, some of the PUCCH Format 1 rows are configured with inter-slot frequency hopping. If the $r_{PUCCH}$ corresponds to one of the rows configured with inter-slot frequency hopping, then the UE 110 determines that the PUCCH transmission with transmissions will be transmitted with inter-slot frequency hopping. Otherwise, the UE 110 determines that the frequency hopping type will be intra-slot. In some embodiments, the UE 110 may determine the frequency hopping type based on the indicated frequency hopping type for Msg3.

Figure 5:
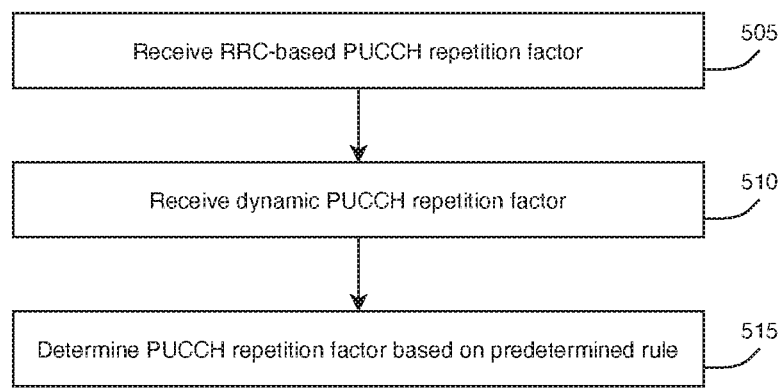
FIG. 5 shows a method of determining PUCCH repetitions when a UE receives more than one PUCCH repetition configuration according to various exemplary embodiments.

FIG. 5 shows a method 500 of determining PUCCH repetitions when the UE 110 receives more than one PUCCH repetition configuration according to various exemplary embodiments. At 505, the UE 110 receives an RRC-based PUCCH repetition factor indication from the gNB 120A (or 120B). For example, this indication may be provided in the nrofSlots field of the RRC configuration. At 510, the UE 110 receives a dynamic indication of a PUCCH repetition factor from the gNB 120A. For example, this dynamic indication may be provided by a DCI that implicitly (e.g., selecting RRC-configured PUCCH resource having associated repetition factor) or explicitly indicates the PUCCH repetition factor.

At 515, the UE 110 determines the PUCCH repetition factor based on a predetermined rule. In some embodiments, the predetermined rule may be that the UE 110 should base the PUCCH repetition determination solely on the dynamic indication received at 510. In some embodiments, the predetermined rule may be that the UE 110 should base the PUCCH repetition determination on both the RRC-based and dynamic PUCCH repetition factor indications. In such a scenario, the UE 110 may determine that the number of PUCCH repetitions is the product (e.g., 6 repetitions) of the RRC-based PUCCH repetition factor indication (e.g., 2 repetitions) and the dynamic PUCCH repetition factor indication (e.g., 3 repetitions). In some embodiments, if the UE 110 indicates that it is capable of handling a dynamic PUCCH repetition factor indication, then the UE 110 may not be configured to handle a received RRC-based PUCCH repetition factor indication. In some embodiments, some repetition indications may be dynamic for some PUCCH formats and RRC-based for other PUCCH formats. For example, both RRC-based and dynamic PUCCH repetition factor indications may be supported for PUCCH Format 3 while only RRC-based PUCCH repetition factor indications may be supported for PUCCH Formats 1 and 4. In the case of both types of indications being supported, the UE 110 may determine the PUCCH repetition factor based on the predetermined rule as described above. In the case of only RRC-based indications, no indication of a PUCCH repetition factor in the nrofSlots field would indicate no PUCCH repetitions.

Figure 6:
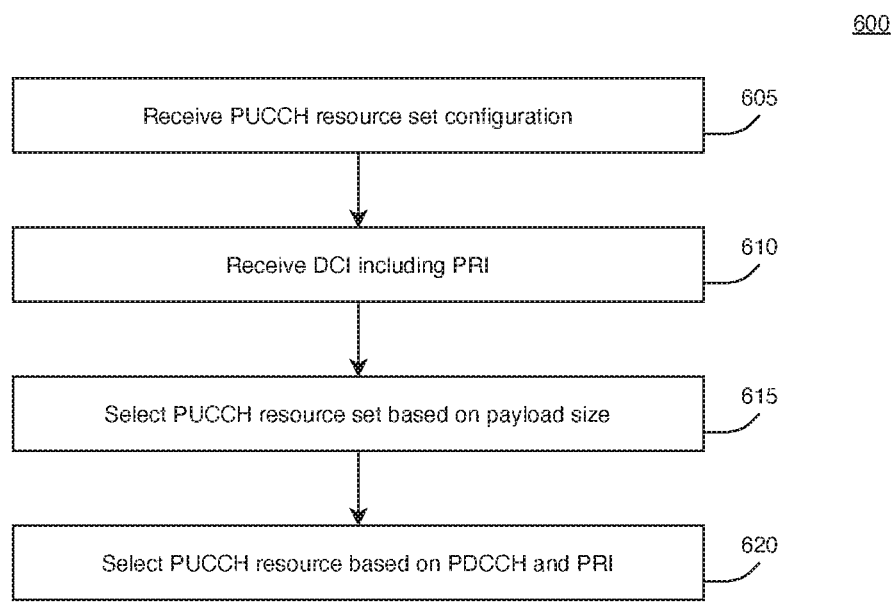
FIG. 6 shows a method of determining a PUCCH repetition factor when each PUCCH resource includes an associated PUCCH repetition factor according to various exemplary embodiments.

FIG. 6 shows a method 600 of determining a PUCCH repetition factor when each PUCCH resource includes an associated PUCCH repetition factor according to various exemplary embodiments. At 605, the UE 110 receives a PUCCH resource set configuration from the gNB 120A (or 120B). The resource set configuration may include up to four (4) configured PUCCH resource sets. The first resource set may include up to 32 PUCCH resources while the remaining resource sets may include up to 8 PUCCH resources. The selection of a resource set by the UE 110 is based on a payload (UCI bits) of the PUCCH transmission (as indicated in 3GPP 38.213 Section 9.2.1).

At 610, the UE 110 receives a Format 1_0 or 1_1 DCI from the gNB 120A. The DCI includes a PUCCH resource indicator (PRI) bit-field ($\Delta_{PRI}$) that includes up to 3 bits. At 615, the UE 110 selects one of the configured PUCCH resource sets based on a payload size (number of UCI bits) of the PUCCH transmission.

At 620, the UE 110 selects a PUCCH resource from the selected resource set based on (i) the number ($N_{CCE}$) of control channel elements (CCEs) of a control resource set (CORESET) of a PDCCH reception with DCI Format 1_0 or 1_1, (ii) a first CCE ($n_{CCE}$) of that PDCCH reception, and (iii) the PRI ($\Delta_{PRI}$) indicated in the DCI.

In some embodiments, the UE 110 is configured to select the PUCCH resource of the selected PUCCH resource set based on the following equation regardless of which resource set was selected at 615.

$$r_{PUCCH} = \begin{cases} \left\lfloor \dfrac{n_{CCE,p} \cdot \left(\frac{R_{PUCCH}}{8}\right)}{N_{CCE,p}} \right\rfloor + \Delta_{PRI} \cdot \left(\dfrac{R_{PUCCH}}{8}\right) & \text{if } \Delta_{PRI} < R_{PUCCH} \bmod 8 \\ \left\lfloor \dfrac{n_{CCE,p} \cdot \left(\frac{R_{PUCCH}}{8}\right)}{N_{CCE,p}} \right\rfloor + \Delta_{PRI} \cdot \left(\dfrac{R_{PUCCH}}{8}\right) + R_{PUCCH} \bmod 8 & \text{if } \Delta_{PRI} \geq R_{PUCCH} \bmod 8 \end{cases}$$

Equation 1

In some embodiments, the UE 110 uses the above equation to select the PUCCH resource only if the selected PUCCH resource set is indicated as pucch-ResourceSetId=k, where k>1. In such a scenario, PUCCH resource sets to which the above equations are not applicable are limited to a maximum of 8 resources per set.

In some embodiments, the UE 110 may use the above equation to select the PUCCH resource if the selected resource set is the first resource set having up to 32 resources (pucch-ResourceSetId=0). If, however, the selected resource set is a different resource set, the UE 110 may use the following equation to select the PUCCH resource since the other resource sets have less resources than the first resource set.

$$r_{PUCCH} = \left\lfloor \dfrac{2 \cdot n_{CCE,0}}{N_{CCE}} \right\rfloor + 2 \cdot \Delta_{PRI}$$

Equation 2

In some embodiments, at least the first resource set (pucch-ResourceSetId=0) may include up to 64 resources, which may be divided into two subsets, each of which may include up to 32 resources. If the result of the following equation is 0, then the UE 110 selects a resource from the first 32 resources. If the result is 1, then the UE 110 selects a resource from the remaining resources. If the result is 0, then the UE 110 selects a resource from the first half of the resources and if the result is 1, then the UE 110 selects a resource from the second half of the resources.

$$\left\lfloor \dfrac{2 \cdot n_{CCE,0}}{N_{CCE}} \right\rfloor$$

Equation 3

After determining which subset of the up to 64 resources are indicated based on the above equation, the UE 110 applies either Equation 1 or Equation 2 as described above to select the PUCCH resource from the indicated subset.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above-described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
    receiving a first physical uplink control channel (PUCCH) repetition factor indication, wherein the first PUCCH repetition factor indication is provided by a nrofSlots information element (IE) in a radio resource control (RRC) message;
    receiving a downlink control information (DCI) transmission;
    determining whether the DCI includes a second PUCCH repetition factor indication; and
    determining a number of PUCCH repetitions based on at least one of the first and second PUCCH repetition factor indications, wherein when the DCI does not include the second PUCCH repetition factor, the number of PUCCH repetitions is based on at least the nrofslots IE and when the DCI includes the second PUCCH repetition factor, the number of PUCCH repetitions is based on at least the second PUCCH repetition factor.

2. The processor of claim 1, wherein the number of PUCCH repetitions is based only on the second PUCCH repetition factor indication when the second PUCCH repetition factor is dynamically indicated.

3. The processor of claim 1, wherein the UE is capable of receiving a dynamic PUCCH repetition factor indication.

4. The processor of claim 1, wherein a dynamic PUCCH repetition factor indication is provided for a first group of PUCCH formats and an RRC-based PUCCH repetition factor indication is provided for a second group of PUCCH formats.

5. The processor of claim 4, wherein the first group and the second group include one or more same PUCCH formats.

6. A processor of a user equipment (UE) configured to perform operations comprising:
    receiving a cell-specific physical uplink control channel (PUCCH) configuration;
    determining a row index corresponding to a PUCCH resource table; and
    determining a PUCCH repetition factor for a transmission over a cell-specific PUCCH, wherein the PUCCH repetition factor is based on at least a repetition factor corresponding to the row index.

7. The processor of claim 6, wherein the operations further comprise:
    determining a PUCCH frequency hopping type based on a frequency hopping type associated with the row index.

8. The processor of claim 6, wherein the operations further comprise:
    receiving a Message 3 (Msg3) transmission having a Msg3 repetition factor, wherein the PUCCH repetition factor is based on at least the Msg3 repetition factor; and
    determining a PUCCH frequency hopping type based on a frequency hopping type of the Msg3 transmission.

9. The processor of claim 6, wherein the operations further comprise:
    receiving a physical downlink control channel (PDCCH) transmission scheduling a Message 4 (Msg4) transmission, wherein the PUCCH repetition factor is based on at least an aggregation level (AL) of the PDCCH transmission.

10. The processor of claim 6, wherein the operations further comprise:
    receiving a downlink control information (DCI).

11. The processor of claim 10, wherein one or more bits of a downlink assignment indicator (DAI) field of the DCI transmission indicate whether the PUCCH resource table is to be interpreted in a legacy manner with no repetitions or in a newly configured manner with repetition factors greater than one.

12. The processor of claim 10, wherein one or more bits of a downlink assignment indicator (DAI) field of the DCI transmission are mapped to repetition factors defined by a system information block (SIB).

13. A processor of a user equipment (UE) configured to perform operations comprising:
    receiving a physical uplink control channel (PUCCH) resource set configuration, wherein the PUCCH resource set configuration includes up to four PUCCH resource sets;
    receiving a downlink control information (DCI) transmission including a PUCCH resource indicator (PRI);
    selecting one of the up to four PUCCH resource sets based on a payload size of a PUCCH transmission to be sent; and
    selecting a PUCCH resource ($r_{PUCCH}$) from the selected PUCCH resource set based on (i) a number ($N_{CCE}$) of control channel elements (CCEs) of a control resource set (CORESET) of a physical downlink control channel (PDCCH) reception with DCI Format 1_0 or 1_1, (ii) a first CCE ($n_{CCE}$) of the PDCCH reception, and (iii) the PRI of the DCI transmission.

14. The processor of claim 13, wherein the PUCCH resource ($r_{PUCCH}$) is selected based on $$r_{PUCCH} = \left\{ \begin{array}{ll} \left[\dfrac{n_{CCE,p} \cdot \left(\dfrac{R_{PUCCH}}{8}\right)}{N_{CCE,p}}\right] + \Delta_{PRI} \cdot \left(\dfrac{R_{PUCCH}}{8}\right) & \text{if } \Delta_{PRI} < R_{PUCCH} \bmod 8 \\ \left[\dfrac{n_{CCE,p} \cdot \left(\dfrac{R_{PUCCH}}{8}\right)}{N_{CCE,p}}\right] + \Delta_{PRI} \cdot \left(\dfrac{R_{PUCCH}}{8}\right) + R_{PUCCH} \bmod 8 & \text{if } \Delta_{PRI} \geq R_{PUCCH} \bmod 8 \end{array} \right\}.$$

15. The processor of claim 13, wherein a first one of the up to four resource sets includes up to thirty-two resources and each of remaining ones of the up to four resource sets includes up to eight resources.

16. The processor of claim 15, wherein, when the first one of the up to four resource sets is selected, the PUCCH resource ($r_{PUCCH}$) is selected based on $$r_{PUCCH} = \left\{ \begin{array}{ll} \left[\dfrac{n_{CCE,p} \cdot \left(\dfrac{R_{PUCCH}}{8}\right)}{N_{CCE,p}}\right] + \Delta_{PRI} \cdot \left(\dfrac{R_{PUCCH}}{8}\right) & \text{if } \Delta_{PRI} < R_{PUCCH} \bmod 8 \\ \left[\dfrac{n_{CCE,p} \cdot \left(\dfrac{R_{PUCCH}}{8}\right)}{N_{CCE,p}}\right] + \Delta_{PRI} \cdot \left(\dfrac{R_{PUCCH}}{8}\right) + R_{PUCCH} \bmod 8 & \text{if } \Delta_{PRI} \geq R_{PUCCH} \bmod 8 \end{array} \right\}.$$

17. The processor of claim 16, wherein, when any other one of the up to four resource sets is selected, the PUCCH resource ($r_{PUCCH}$) is selected based on $$r_{PUCCH} = \left[\dfrac{2 \cdot n_{CCE,0}}{N_{CCE}}\right] + 2 \cdot \Delta_{PRI}.$$

18. The processor of claim 13, wherein a first one of the up to four resource sets includes up to sixty-four resources, wherein the sixty-four resources are divided into a first subset and a second subset, and wherein an indication of the first subset or second subset is based on a value of $$\left[\dfrac{2 \cdot n_{CCE,0}}{N_{CCE}}\right].$$

* * * * *